United States Patent [19]

Katto

[11] Patent Number: 5,694,171
[45] Date of Patent: Dec. 2, 1997

[54] MOVING IMAGE ENCODING APPARATUS

[75] Inventor: Jiro Katto, Tokyo, Japan

[73] Assignee: NEC Corporation, Tokyo, Japan

[21] Appl. No.: 517,763

[22] Filed: Aug. 22, 1995

[30] Foreign Application Priority Data

Aug. 22, 1994 [JP] Japan .................................. 6-196568

[51] Int. Cl.$^6$ .................................................. H04N 7/36
[52] U.S. Cl. ................................. 348/405; 348/412
[58] Field of Search .................... 348/384, 390, 348/401, 402, 409, 412, 411, 413, 415, 416, 419, 405

[56] References Cited

U.S. PATENT DOCUMENTS

| | | | |
|---|---|---|---|
| 5,134,476 | 7/1992 | Aravind et al. | 348/415 |
| 5,185,819 | 2/1993 | Ng et al. | 348/409 |
| 5,473,378 | 12/1995 | Tamitani | 348/416 |

OTHER PUBLICATIONS

"Embedded Image Coding Using Zerotrees of Wavelet Coefficients" by J.M. Shapiro, IEEE Transactions on Signal Processing, vol. 41, No. 12, Dec., 1993, pp. 3445–3462.

"Subband Coding of Images" by J.W. Woods et al., IEEE Transactions on Acoustics Speech Processing, vol. ASSP 34, No. 5, Oct., 1986, pp. 1278–1288.

*Primary Examiner*—Amelia Au
*Attorney, Agent, or Firm*—Sughrue, Mion, Zinn, Macpeak & Seas, PLLC

[57] ABSTRACT

A moving image encoding apparatus includes an image encoder and a prediction structure determination unit. The image encoder having a first mode for performing intra-frame coding for moving image data without performing prediction along a time axis, the moving image data being constituted by a plurality of continuous frames, a second mode for performing inter-frame prediction for the moving image data using one-way prediction along the time axis, and a third mode for performing frame interpolation prediction for the moving image data using two-way prediction along the time axis. The prediction structure determination unit determines positions for one or more frames to be subjected to the intra-frame coding in the first mode, frames to be subjected to the inter-frame prediction in the second mode, and a frames to be subjected to the frame interpolation prediction in the third mode in accordance with at least the number of frames corresponding to inter-frame prediction coding in the second mode that occur in an input image signal.

11 Claims, 6 Drawing Sheets

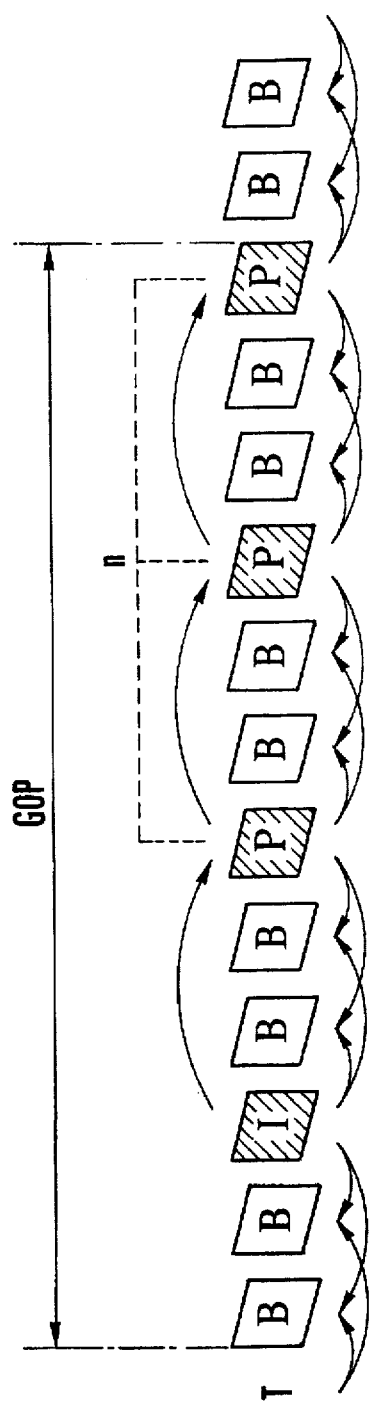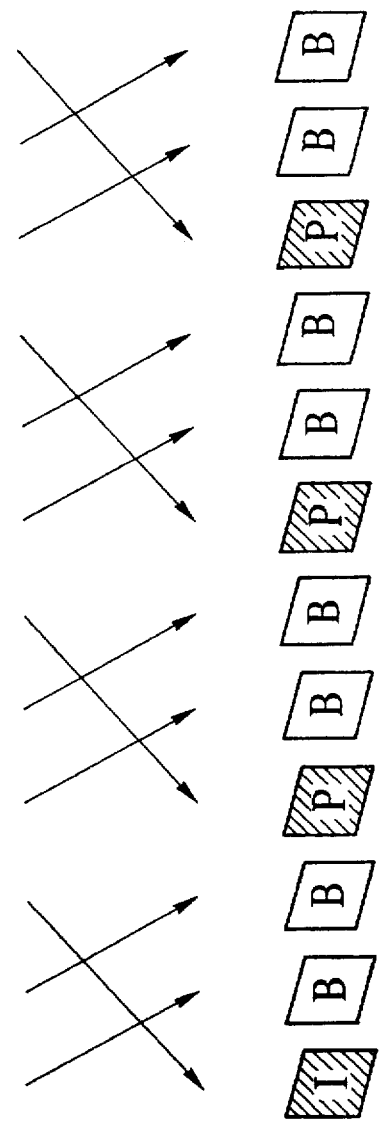
F I G. 2A
ENCODER INPUT
PRIOR ART
F I G. 2B
ENCODER OUTPUT
PRIOR ART

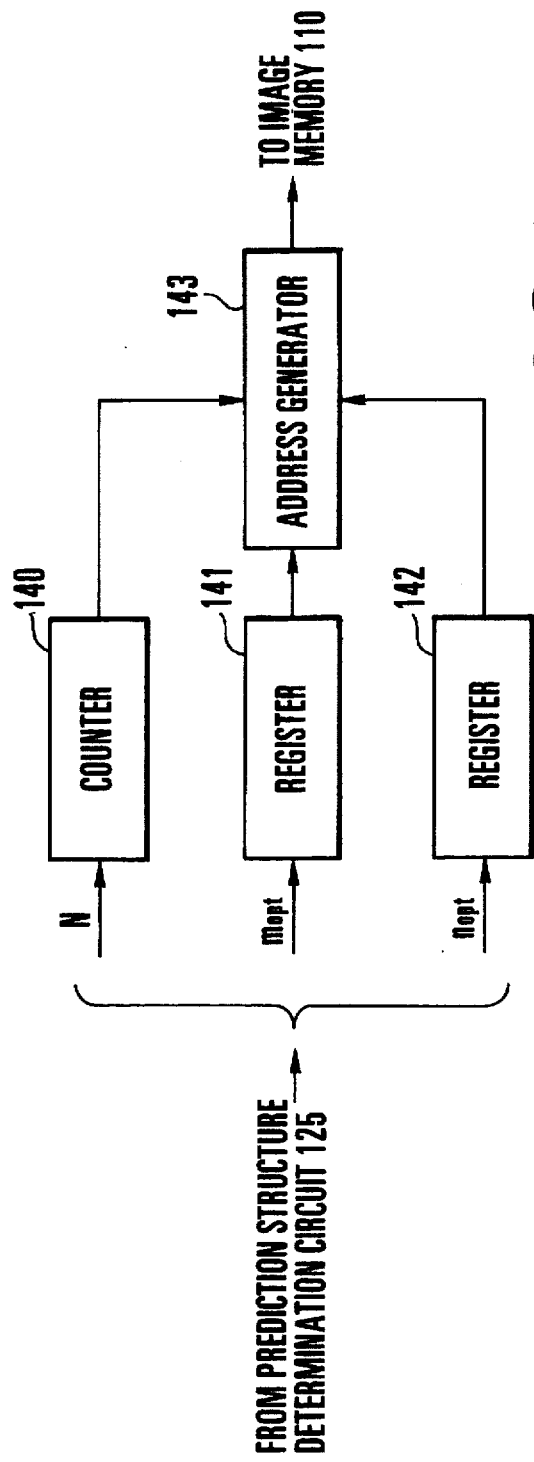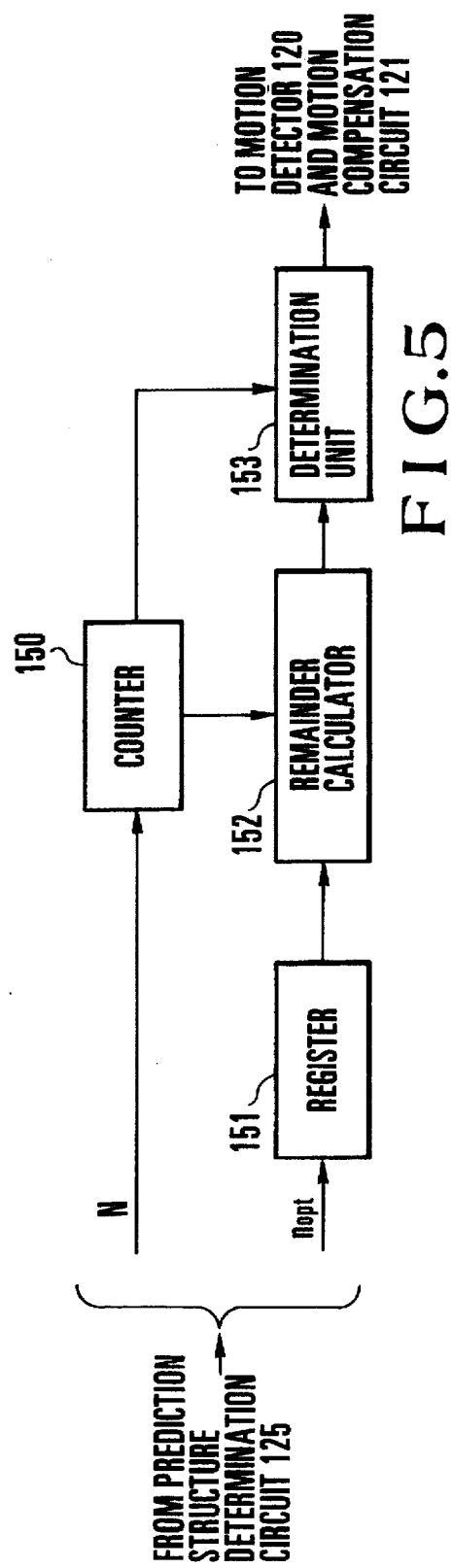

MOVING IMAGE ENCODING APPARATUS

BACKGROUND OF THE INVENTION

The present invention relates to a moving image encoding apparatus and, more particularly, to high-efficiency encoding of a digital moving image signal.

As a conventional high-efficiency encoding technique of a moving image signal, a scheme for reducing redundancy of image data is available by combining intra-frame coding which does not perform prediction along the time axis, inter-frame prediction which performs only one-way prediction along the time axis, and frame interpolation prediction which performs two-way prediction along the time axis. An example of such a scheme is an MPEG (Moving Pictures Expert Group) scheme, as shown in FIGS. 2A and 2B. This scheme is described in IS-11172 and 13818-2 as the international standard schemes of moving image encoding.

An image subjected to intra-frame coding, an image subjected to inter-frame prediction, and an image subjected to frame interpolation prediction are called I-, P-, and B-pictures. The prediction structures of these image signals are shown in FIGS. 3A to 3C. In the I-picture shown in FIG. 3A, prediction is not performed in the time direction, and redundancy in only the spatial direction is reduced to achieve compression. In the P-picture shown in FIG. 3B, the encoded frame is used as a reference image to perform one-way prediction along the time axis, thereby reducing the redundancy. This reference image is an already encoded I-picture or a P-picture. In the B-picture shown in FIG. 3C, two already encoded frames are used as reference images to perform two-way prediction along the time axis, thereby reducing the redundancy. These reference images are two already encoded I-pictures or two P-pictures.

The above processing is performed in units of frames or fields. As shown in FIG. 2A, as a set of pictures, a GOP (Group Of Pictures) is defined, wherein m is a distance between the I- and P-pictures, n is the number of P-pictures in one GOP. In the B-picture, an I- or P-picture succeeding the B-picture along the time axis is used for prediction. For this purpose, encoding of the I- or P-picture succeeding the B-picture along the time axis must be completed before encoding of the B-picture. Therefore, as shown in FIG. 2B, the order of frames output from the encoder is different from that input to the encoder shown in FIG. 2A.

The above conventional encoding scheme is realized using an image order change circuit 1 and an image signal encoder 2. Referring to FIG. 7, the image order change circuit 1 controls to change the order of input signals to the image signal encoder 2 in units of frames. This order corresponds to the order of outputs from the encoder shown in FIG. 2B. More specifically, an image order control circuit 11 determines the next frame of the image frames written in areas #1, #2, #3 , . . . , #M of an image memory 10, which is to be sent to the image signal encoder 2 in accordance with an order determined by a picture arrangement method shown in FIG. 2B.

The image signal encoder 2 actually encodes input image data. In the image signal encoder 2, a subtracter 12 outputs a difference between the input image supplied from the image order change circuit 1 and a motion-compensated prediction image generated by a motion compensator 21 using the previous encoded reference images. A converter 13 converts a difference image from the subtracter 12. A quantizer 14 quantizes the conversion result from the converter 13. A variable length encoder 15 generates encoded data in accordance with this quantization result and stores or transmits the encoded data. An inverse quantizer 16 inversely quantizes the quantization result, and an inverse converter 17 inversely converts the inverse quantization result. An adder 18 adds the motion-compensated prediction image generated by the motion compensator 21 to the inverse conversion result and writes the sum in an image memory 19 as a reference image which can be used for subsequent prediction. The image memory 19 has at least two frame areas #1 and #2 for two-way prediction using two images.

A motion detector 20 detects a motion vector using the input image from the image order change circuit 1 and the reference image supplied from the image memory 19. In two-way prediction, motion vectors in the forward and backward directions are detected using two reference images preceding and succeeding along the time axis. The motion compensator 21 generates a motion-compensated prediction image using the reference images from the image memory 19 in accordance with the motion vectors supplied from the motion detector 20. A motion compensation control circuit 22 determines the current input image as the I-, P-, or B-picture in accordance with the order determined by the picture arrangement method shown in FIG. 2B and controls the prediction mode of the motion detector 20 and the motion compensator 21 in the forms corresponding to FIGS. 3A to 3C.

An encoding amount control circuit 23 updates a quantization step width used in the quantizer 14 and the inverse quantizer 16 in accordance with an encoding amount supplied from the variable length encoder 15 and realizes control of subsequent information volumes. More specifically, when the generated encoding amount is large, the quantization step width is increased. However, when the generated encoding amount is small, the quantization step width is reduced. The method of updating the quantization step width may be changed depending on the current input image as an I-, P-, or B-picture. This aims at improving the total encoding efficiency by allowing image degradation of the B-picture, using the fact that image degradation of the B-picture tends not to be visually detected. More specifically, since the square of the quantization step width is approximately proportional to the variance of distortion, a quantization step width ratio is properly set to determine distortion assignment to each picture.

Note that the encoding efficiency of the prediction structure shown in FIG. 2B is known to change depending on the arrangement method for I-, P-, and B-pictures. The information volume of the I-picture not subjected to prediction along the time axis is generally larger than that of P- or B-picture. When the frame interval of the I-picture is reduced, encoding efficiency is degraded. The effects of inter-frame prediction in the P-picture and the frame interpolation prediction in the B-picture are degraded when a distance to the reference image is increased. When a distance between the reference images is increased, encoding efficiency is degraded. On the other hand, two-way prediction in the B-picture is more effective than one-way prediction therein. When a B-picture is inserted on the basis of an appropriate distance between the reference images, a high encoding efficiency can be obtained.

Conventionally, a picture arrangement is determined on the basis of trial-and-error in accordance with a simulation result using test images. In addition, the picture arrangement is permanently used and cannot be changed during the encoding period. For this reason, the features of an image changing along the time axis cannot be sufficiently reflected, and a problem on encoding efficiency is left unsolved.

The encoding efficiency of the conventional moving image encoding scheme greatly changes depending on the arrangement method for I-, P-, and B pictures. An effective picture arrangement method has not yet been established.

SUMMARY OF THE INVENTION

It is an object of the present invention to provide a moving image encoding apparatus capable of determining a picture arrangement method in which encoding efficiency is sufficiently improved.

In order to achieve the above object of the present invention, there is provided a moving image encoding apparatus comprising image encoding means having a first mode for performing intra-frame coding for moving image data without performing prediction along a time axis, the moving image data being constituted by a plurality of continuous frames, a second mode for performing inter-frame prediction for the moving image data using one-way prediction along the time axis, and a third mode for performing frame interpolation prediction for the moving image data using two-way prediction along the time axis, and prediction structure determination means for determining respective positions for frames subjected to the intra-frame coding in the first mode, for frames subjected to the inter-frame prediction in the second mode, and for frames subjected to the frame interpolation prediction in the third mode, in accordance with at least the number of frames corresponding to inter-frame prediction coding in the second mode.

BRIEF DESCRIPTION OF THE DRAWINGS

FIGS. 2A and 2B are views showing a prediction structure according to an MPEG scheme;

FIG. 4 is a block diagram showing an arrangement of an image order control circuit 11 in FIG. 1;

FIG. 5 is a block diagram showing an arrangement of a motion compensation control circuit 22 in FIG. 1;

DESCRIPTION OF THE PREFERRED EMBODIMENT

The present invention will be described in detail with reference to the accompanying drawings.

Figure 1:
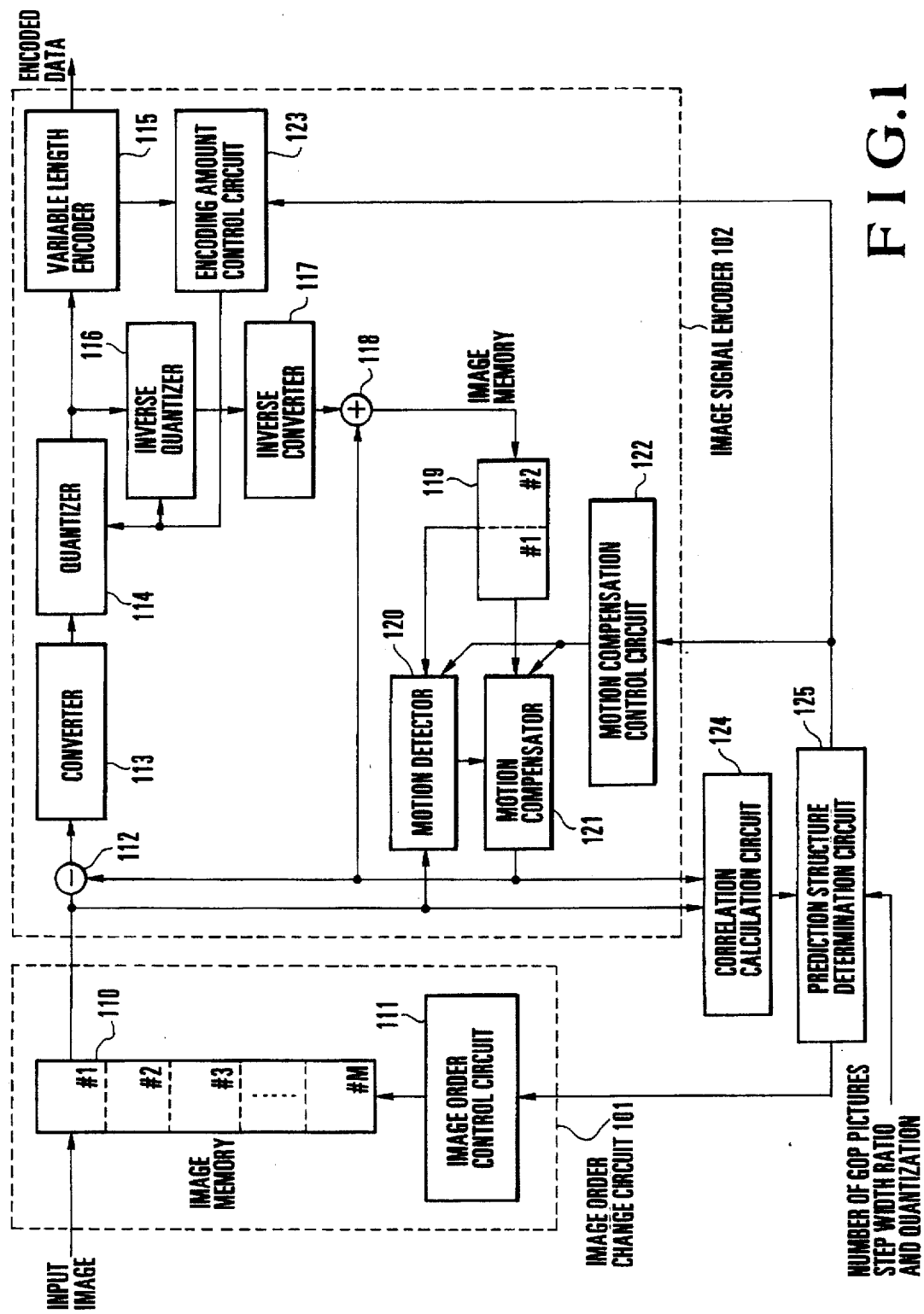
FIG. 1 is a block diagram of prediction structure determination according to an embodiment of the present invention.
Figures 3A, 3B, 3C:
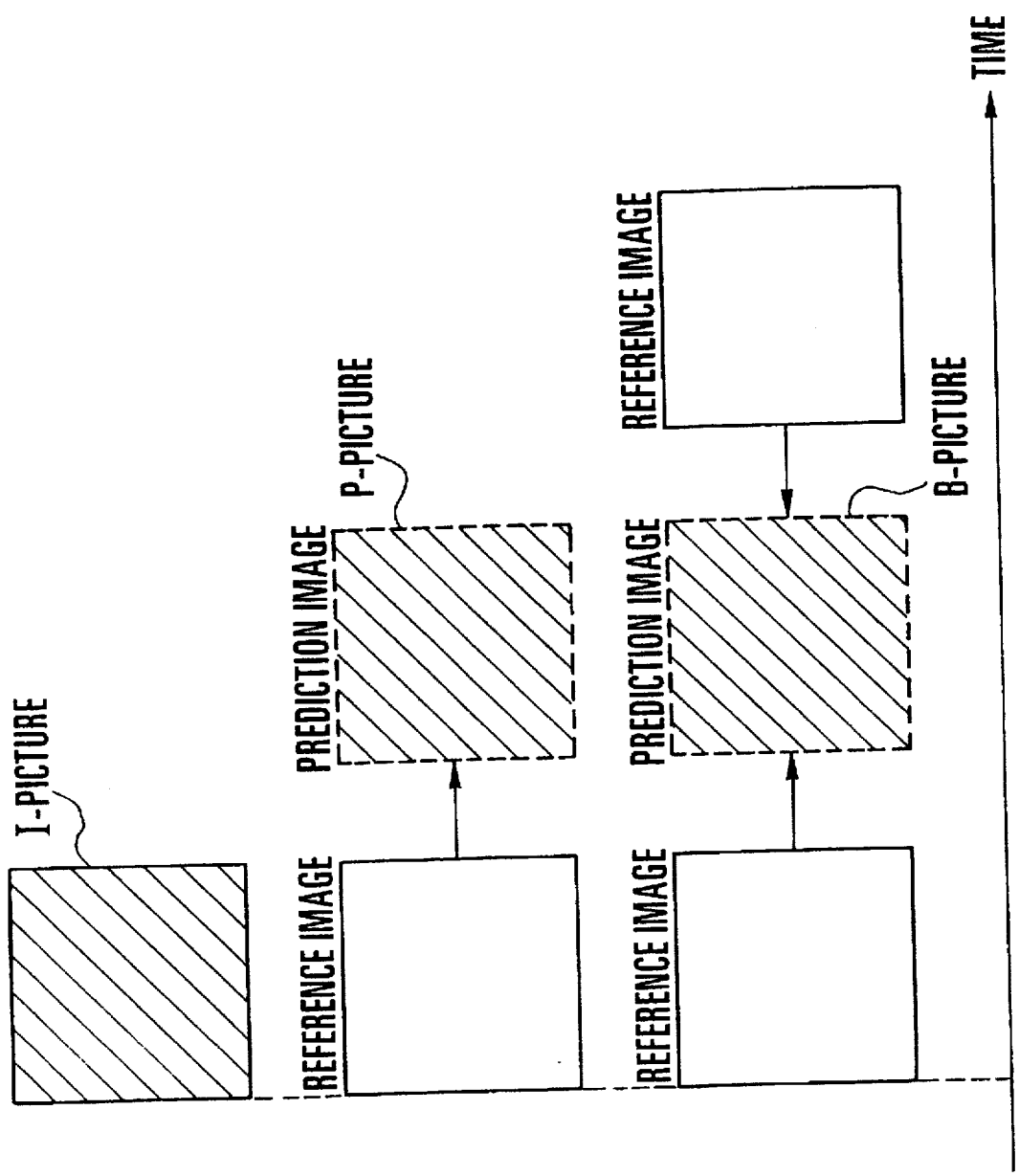
FIGS. 3A to 3C are views showing a process for generating I-, P-, and B-pictures.

FIG. 1 shows a moving picture encoding scheme according to an embodiment of the present invention.

Referring to FIG. 1, an image order change circuit 101 changes the order of image data written in areas #1, #2, #3, . . . , #M of an image memory 110 in units of frames to be output to an image signal encoder 102. An image order control circuit 111 in the image order change circuit 101 adaptively determines the order of frames output from the image memory 110, in accordance with the picture arrangement method supplied from a prediction structure determination circuit 125.

FIG. 4 shows an arrangement of the image order control circuit 111. A counter 140 holds the number of frames of one GOP from the prediction structure determination circuit 125 and counts the number of input frames. This count is reset to zero when the number of frames reaches the number of frames of one GOP. A register 141 holds the distance $M_{opt}$ between I- and P-pictures supplied from the prediction structure determination circuit 125. A register 142 holds the number of $N_{opt}$ P-pictures of one GOP from the prediction structure determination circuit 125. An address generator 143 generates an address of the image data output from the image memory 110 to the image signal encoder 102, using the distance between I- and P-pictures from the register 141 and the number of P-pictures of one GOP from the register 142.

Referring back to FIG. 1, the image signal encoder 102 has a function of actually encoding input image data. In the image signal encoder 102, a subtracter 112 outputs a difference between the input image supplied from the image order change circuit 101 and a motion-compensated prediction image generated by the motion compensator 121 using the previous encoded reference images. A converter 113 converts a difference image from the subtracter 112, and a quantizer 114 quantizes the conversion result. A variable length encoder 115 generates encoded data from this quantization result. The encoded data is stored or transmitted. An inverse quantizer 116 inversely quantizes the quantization result. An inverse converter 117 inversely converts the inverse quantization result. An adder 118 adds the inverse conversion result to a motion-compensated prediction image generated by a motion compensator 121 and writes the sum in an image memory 119 as a reference image used for subsequent prediction. The image memory 119 has at least two frame areas #1 and #2 for two-way prediction using two images.

A motion detector 120 detects a motion vector using the input image from the image order change circuit 101 and the reference image from the image memory 119 in accordance with an input prediction mode. In two-way prediction, motion vectors in the forward and backward directions are detected using two reference images preceding and succeeding along the time axis. In one-way prediction, a forward motion vector is detected using the previous reference image. The motion compensator 121 generates a motion-compensated prediction image using the reference images from the image memory 119 in accordance with the motion vectors supplied from the motion detector 120.

A motion compensation control circuit 122 adaptively determines the prediction mode of the motion detector 120 and the motion compensator 121 in accordance with the picture arrangement method supplied from the prediction structure determination circuit 125.

An encoding amount control circuit 123 updates a quantization step width used in the quantizer 114 and the inverse quantizer 116 in accordance with an encoding amount supplied from the variable length encoder 115 and realizes control of subsequent information volumes. In this case, the encoding amount control circuit 123 updates the quantization step width adaptively used in the quantizer 114 and the inverse quantizer 116 in accordance with the picture arrangement method supplied from the prediction structure determination circuit 125.

FIG. 5 shows an arrangement of the motion compensation control circuit 150. A counter 122 holds the number of frames of one GOP from the prediction structure determination circuit 125 and counts the number of input frames. This count is reset when the number of counted frames reaches the number of frames of one GOP. A register 151 holds the number of P-pictures of one GOP from the prediction structure determination circuit 125. A remainder calculator 152 outputs a remainder obtained when the number of currently input frames from the counter 150 is divided by the number of P-pictures of one GOP from the register 151. A determination unit 153 receives the counter value from the counter 150 and the remainder from the remainder calculator 152 and informs to the motion detector 120 and the motion compensator 121 that the prediction mode of the input image is an I-picture mode for the counter value of zero, a P-picture mode for a non-zero counter value and a zero remainder, and a B-picture mode in other cases. The circuit arrangement shown in FIG. 5 is similarly used in the encoding amount control circuit 123. The encoding amount control circuit 123 updates the quantization step width in accordance with the prediction mode information from the determination unit 153.

Referring back to FIG. 1, a correlation calculation circuit 124 calculates a correlation between the motion-compensated prediction image from the motion compensator 121 and the input image. The prediction structure determination circuit 125 receives the number of frames of one GOP, a quantization step width ratio, and an inter-frame correlation coefficient from the correlation calculation circuit 124 and determines a picture arrangement method.

Figure 6:
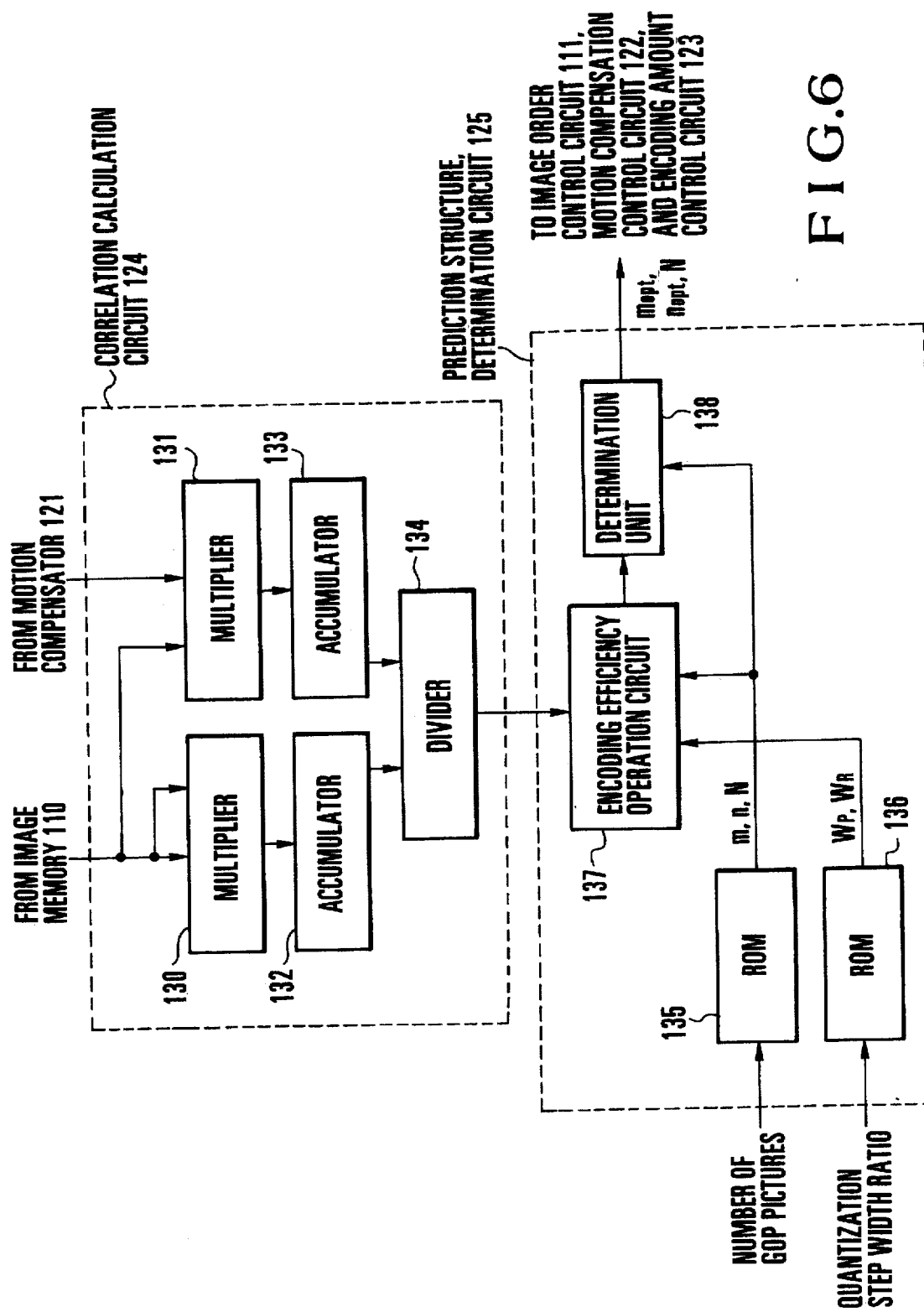
FIG. 6 is a block diagram showing an arrangement of a prediction structure determination circuit 25 in FIG. 1.
Figure 7:
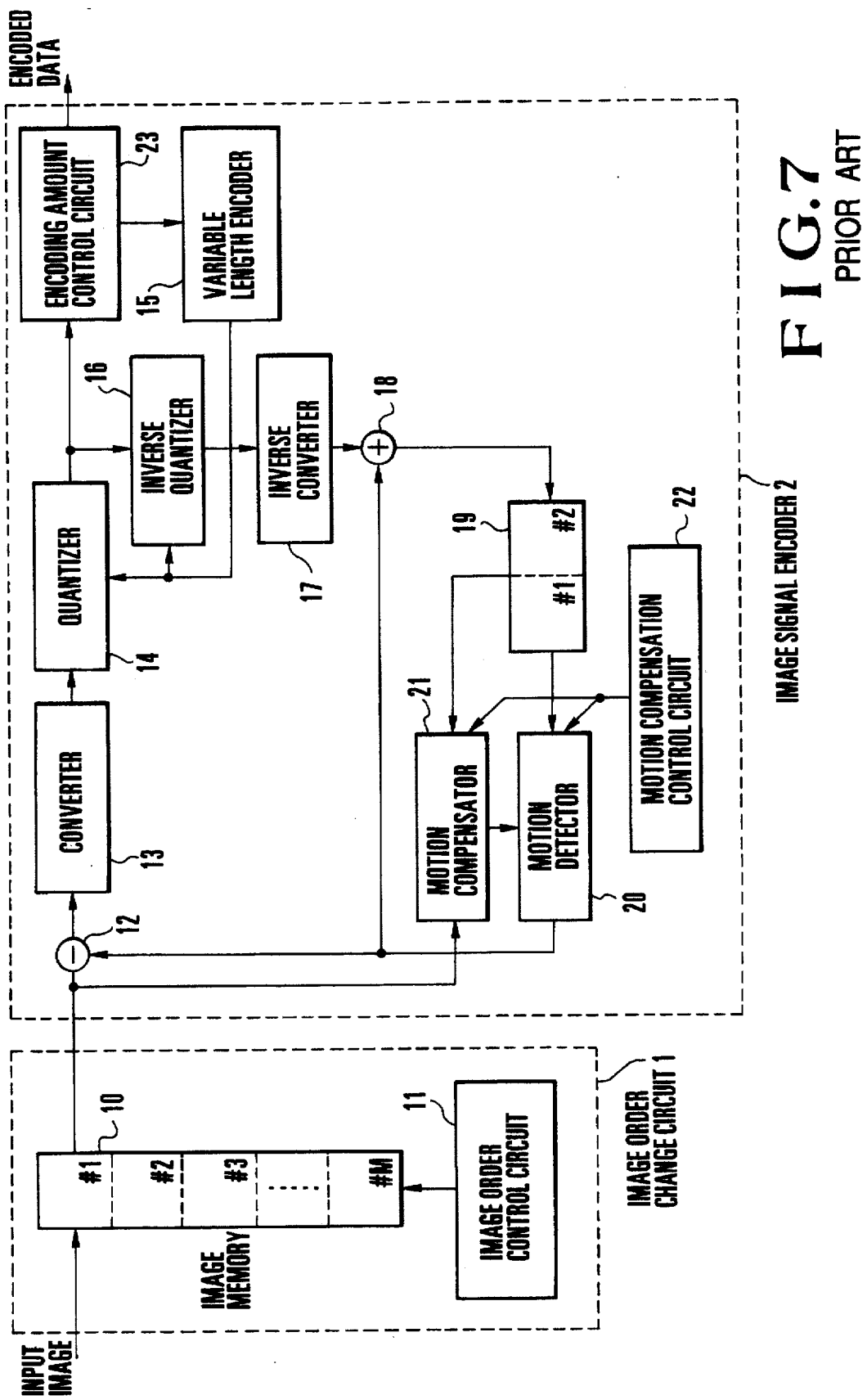
FIG. 7 is a block diagram of a conventional prediction structure determination apparatus.

FIG. 6 shows an arrangement of the correlation calculation circuit 124 and the prediction structure determination circuit 125. The correlation calculation circuit 124 comprises multipliers 130 and 131, accumulators 132 and 133, and a divider 134. The multiplier 130 outputs the square value of the input image. The multiplier 131 outputs the product between the input image and the motion-compensated prediction image. The accumulator 132 accumulates outputs from the multiplier 130, and the accumulator 133 accumulates outputs from the multiplier 131. The divider 134 divides the output from the accumulator 133 by the output from the accumulator 132 and outputs the resultant quotient.

The prediction structure determination circuit 125 comprises ROMs (Read Only Memory) 135 and 136, an encoding efficiency operation circuit 137, a determination unit 138. The ROM table 135 inputs the number N of GOP pictures and outputs combinations each consisting of a distance m between I- and P-pictures assumable for the number N and the number n of P-pictures of one GOP. The ROM table 136 receives a quantization step width ratio of the I-, P-, and B-pictures and outputs parameters $\alpha$ ($W_P$) and $\beta$ ($W_B$) representing the resultant quantization characteristics for the ratio. The encoding efficiency operation circuit 137 calculates an encoding efficiency in accordance with equation (5) (to be described later). The determination unit 138 determines a combination which imparts the maximum encoding efficiency in all the possible picture arrangements. In addition, the determination unit 138 outputs the determined picture arrangement method to the image order control circuit 111, the motion compensation control circuit 122, and the encoding amount control circuit 123.

The operation of this embodiment will be described with reference to FIG. 1.

The number of frames of one GOP, and the quantization step width ratio of I-, P-, and B-pictures are written in the prediction structure determination circuit 125. This can be performed before or after encoding. The correlation calculation circuit 124 outputs the preset correlation coefficient value or the correlation coefficient value calculated during encoding to the prediction structure determination circuit 125. By using these parameters, the prediction structure determination circuit 125 determines a picture arrangement method. The updated picture arrangement is output to the image order change circuit 111, the motion compensation control circuit 122, and the encoding amount control circuit 123. The subsequent circuit arrangement is operated in accordance with this picture arrangement.

The frame arrangement determination operation of the prediction structure determination circuit 125 will be described below.

When a distance between the I- and P-pictures is defined as m, and the number of P-pictures is defined as n, the picture arrangement in one GOP shown in FIG. 2A is normalized as follows:

$$B^{m-1}I(B^{m-1}P)^n \quad (1)$$

In this case, the number N of all the pictures is given as follows:

$$N = m(n+1) \quad (2)$$

The optimization problem on bit assignment for this prediction structure, i.e., the minimization problem of the variance of reproduction errors using the bit rate as a constraint condition is given under the following constraint condition $$R \frac{1}{N} [R_I + n \cdot R_P + (m-1)(n+1) \cdot R_B] \quad (3)$$

as the minimization $$\sigma_r^2 = \frac{1}{N} \left[ \sigma_{r,I}^2 + n \cdot W_P \sigma_{r,P}^2 + (n+1) \cdot \sum_{k=1}^{m-1} W_B \sigma_{r,B}(k)^2 \right] \quad (4)$$

where R is the total number of assigned bits, $R_I$ is the number of bits assigned to the I-picture, $R_P$ is the number of bits assigned to the P-picture, $R_B$ is the number of bits assigned to the B-picture, $\sigma_r^2$ is the reproduction error variance as the average value of the regenerated signal, $\sigma_{r,I}^2$ is the reproduction error variance of the I-picture, $\sigma_{r,P}^2$ is the reproduction error variance of the P-picture, $\sigma_{r,B}(k)^2$ is the reproduction error variance of the B-picture spaced apart from the immediately preceding reference image by k, $W_P$ is the weighting coefficient of distortion for the P-picture, and $W_B$, is the weighting coefficient of distortion for the B-picture.

The encoding efficiency (Gain) of the picture arrangement shown in FIG. 2B can be approximated as follows:

$$\text{Gain}^{-1} = [2W_P \cdot (1-\rho^m)]^{n/N} \cdot \left[ W_B \cdot \frac{S(m-1)}{m-1} \right]^{(m-1)(n+1)/N} \quad (5)$$

When this Gain value is increased, a higher encoding efficiency can be expected. In this case, $\rho$ is the correlation coefficient between adjacent frames and can be approximated as follows:

$$\rho = \frac{E[x(s)x(s-1)]}{E[x(s)]^2} \quad (6)$$

where x(s) is the input signal of the sth frame, x(s−1) is the input signal of the (s−1)th frame, and E[•] represents an operation for obtaining an average value, and $$S(m-1) = \frac{m-1}{2} (3+\rho^m) - 2\rho \cdot \frac{1-\rho^{m-1}}{1-\rho} \quad (7)$$

The coefficients $W_P$ and $W_B$ are determined in accordance with the quantization step width ratio set for each picture, and ρ is an amount which reflects the feature of the input image varying along the time axis and can be obtained by sequentially calculating equation (6). When the number N of pictures of one GOP is given, a combination of the distance m between the I- and P-pictures and the number n of P-pictures of one GOP is so searched as to maximize the encoding efficiency (Gain), thereby obtaining a prediction structure having a high encoding efficiency.

As has been described above, parameters such as the number of frames of one GOP, a quantization step width ratio determined for the I-, P-, and B-pictures, and an inter-frame correlation coefficient are used to determine a prediction structure on the basis of the evaluation amounts obtained from the intra-frame coding arrangement, an inter-frame prediction arrangement, and a frame interpolation prediction arrangement, thereby automatically providing a higher encoding efficiency.

What is claimed is:

1. A moving image encoding apparatus comprising:

image encoding means for encoding moving image data comprising a plurality of continuous frames, said encoding means having a first mode for performing intra-frame coding for moving image data without performing prediction along a time axis, a second mode for performing inter-frame prediction for the moving image data using one-way prediction along the time axis, and a third mode for performing frame interpolation prediction for the moving image data using two-way prediction along the time axis; and prediction structure determination means for determining respective positions for one or more frames to be subjected to the intra-frame coding in the first mode, for frames to be subjected to the inter-frame prediction in the second mode, and for frames to be subjected to the frame interpolation prediction in the third mode in accordance with the number of frames corresponding to inter-frame prediction coding in the second mode that occur in an input image signal, and for determining the respective positions of the frames in accordance with a quantization step width ratio assigned to the frames respectively subjected to the intra-frame coding, the inter-frame prediction, and the frame interpolation prediction in the first, second, and third modes, the determined respective positions for the frames being output to the encoding means.

2. A moving image encoding apparatus comprising:

image encoding means for encoding moving image data comprising a plurality of continuous frames, said encoding means having a first mode for performing intra-frame coding for moving image data without performing prediction along a time axis, a second mode for performing inter-frame prediction for the moving image data using one-way prediction along the time axis, and a third mode for performing frame interpolation prediction for the moving image data using two-way prediction along the time axis; and prediction structure determination means for determining respective positions for one or more frames to be subjected to the intra-frame coding in the first mode, for frames to be subjected to the inter-frame prediction in the second mode, and for frames to be subjected to the frame interpolation prediction in the third mode in accordance with the number of frames corresponding to inter-frame prediction coding in the second mode that occur in an input image signal, and for determining the respective positions of the frames in accordance with an inter-frame correlation count value, the determined respective positions for the frames being output to the encoding means.

3. A moving image encoding apparatus comprising:

image encoding means for encoding moving image data comprising a plurality of continuous frames, said encoding means having a first mode for performing intra-frame coding for moving image data without performing prediction along a time axis, a second mode for performing inter-frame prediction for the moving image data using one-way prediction along the time axis, and a third mode for performing frame interpolation prediction for the moving image data using two-way prediction along the time axis; and prediction structure determination means for determining respective positions for one or more frames to be subjected to the intra-frame coding in the first mode, for frames to be subjected to the inter-frame prediction in the second mode, and for frames to be subjected to the frame interpolation prediction in the third mode in accordance with the number of frames corresponding to inter-frame prediction coding in the second mode that occur in an input image signal, and for determining the respective positions of the frames in accordance with a quantization step width ratio assigned to the frames respectively subjected to the intra-frame coding, the inter-frame prediction, and the frame interpolation prediction in the first, second, and third modes, and an inter-frame correlation count value, the determined respective positions for the frames being output to the encoding means.

4. A moving image encoding apparatus comprising:

image coding means for encoding moving image data comprising a plurality of continuous frames, said encoding means having a first mode for performing intra-frame coding for moving image data without performing prediction along a time axis, a second mode for performing inter-frame prediction for the moving image data using one-way prediction along the time axis, and a third mode for performing frame interpolation prediction for the moving image data using two-way prediction along the time axis; and prediction structure determination means for determining respective positions for one or more frames to be subjected to the intra-frame coding in the first mode, for frames to be subjected to the inter-frame prediction in the second mode, and for frames to be subjected to the frame interpolation prediction in the third mode in accordance with a quantization step width ratio assigned to the frames respectively subjected to the intra-frame coding, the inter-frame prediction, and the frame interpolation prediction in the first, second, and third modes, the determined respective positions for the frames being output to said encoding means.

5. An apparatus according to claim 4, wherein said prediction structure determination means determines the respective positions of the frames in accordance with a quantization step width ratio assigned to the frames respectively subjected to the intra-frame coding, the inter-frame prediction, and the frame interpolation prediction in the first, second, and third modes, and an inter-frame correlation count value.

6. A moving image encoding apparatus comprising:

image encoding means for encoding moving image data comprising a plurality of continuous frames, said encoding means having a first mode for performing intra-frame coding for moving image data without performing prediction along a time axis, a second mode for performing inter-frame prediction for the moving image data using one-way prediction along the time axis, and a third mode for performing frame interpolation prediction for the moving image data using two-way prediction along the time axis; and prediction structure determination means for determining respective positions for one or more frames to be subjected to the intra-frame coding in the first mode, for frames to be subjected to the inter-frame prediction in the second mode, and for frames to be subjected to the frame interpolation prediction in the third mode in accordance with an inter-frame correlation count value, the determined respective positions for the frames being output to said encoding means.

7. A moving image encoding apparatus comprising:

image order changing means for changing an order of frames of moving image data comprising a plurality of continuous frames on the basis of informed positions for the frames of the image data, moving image encoding means, receiving frames from said image order changing means, having a first mode for performing intra-frame coding for image frame data without performing prediction for the image frame data along a time axis, a second mode for performing inter-frame prediction for the image frame data using one-way prediction along the time axis, and a third mode for performing frame interpolation prediction for the image frame data using two-way prediction along the time axis; and prediction structure determination means for determining respective positions for one or more frames to be subjected to the intra-frame coding in the first mode, for frames to be subjected to the inter-frame prediction in the second mode, and for frames to be subjected to the frame interpolation prediction in the third mode in accordance with at least one of 1) the number of frames corresponding to inter-frame prediction coding in the second mode that occur in said plurality of frames and 2) a quantization step width ratio assigned to the frames respectively subjected to the intra-frame coding, the inter-frame prediction, and the frame interpolation prediction in the first, second, and third modes, the respective determined positions for the frames and the quantization step width ratio being output to said image signal encoding means and to said image order changing means.

8. An apparatus according to claim 7, wherein said image signal encoding means comprises:

subtracting means for outputting difference data between compensated prediction image data and the image frame data from said image order changing means;

conversion means for converting the difference data from said subtracting means;

quantization means for quantizing a conversion output from said conversion means;

encoding means for variable-length-encoding a quantization output from said quantization means to output encoded data;

inverse quantization means for inversely quantizing a quantization output from said quantization means;

inverse conversion means for inversely converting an inverse quantization output from said inverse quantization means;

adding means for adding an inverse conversion output from said inverse conversion means and the compensated prediction image data to output reference image data used for prediction;

image memory means for storing at least two reference image data from said adding means;

motion compensation control means for determining one of the first, second, and third modes for each frame in accordance with the respective positions of the frames determined by said prediction structure determination means;

motion detection means for detecting a motion vector using the image frame data from said image order changing means and the reference image data read out from said image memory means in accordance with the determined mode for a respective frame; and motion compensation means for generating a motion-compensated prediction image using the reference image data read out from said image memory means in accordance with the motion vector output from said motion detection means and outputting the motion-compensated prediction image to said subtracting means and said adding means.

9. An apparatus according to claim 8, wherein said apparatus further comprises correlation calculation means for calculating a correlation between the image frame data from said image order changing means and the motion-compensated prediction image data from said motion compensation means, and wherein said prediction structure determination means determines the respective positions of the frames in accordance with at least one of the number of frames corresponding to inter-frame prediction coding in the second mode, a quantization step width ratio assigned to the frames respectively subjected to the intra-frame coding, the inter-frame prediction, and the frame interpolation prediction in the first, second and third modes, and an inter-frame correlation count value output from said correlation calculation means.

10. An apparatus according to claim 9, wherein said prediction structure determination means comprises:

a first read only memory for receiving the number N of frames comprising a group of an input signal and outputting combinations of inter-frame distances m between frames corresponding to intra-frame coding and inter-frame prediction in the first and second modes, respectively, and the number n of frames corresponding to inter-frame prediction within the group in the second mode, a second read only memory for receiving a quantization step width ratio for the frames respectively subjected to the intra-frame coding, inter-frame prediction, and frame interpolation prediction in the first, second and third modes and outputting parameters $W_P$ and $W_R$ representing quantization characteristics corresponding to the quantization step width ratio;

an encoding efficiency calculation circuit for calculating an encoding efficiency Gain by a predetermined equation using outputs from said first and second read only memories and an inter-frame correlation count value ρ output from said correlation calculation means, said predetermined equation being:

$$\text{Gain}^{-1} = [2W_P \cdot (1-\rho^m)]^{n/N} \left[ W_B \cdot \frac{S(m-1)}{m-1} \right]^{(m-1)(n+1)/N}$$

where $W_P$ is the weighting coefficient of distortion for a second mode frame, ρ is the correlation coefficient between adjacent frames, m is the distance between a first mode and second mode frame, n is the number of frames corresponding to second mode frames, S(m−1) is defined as follows:

$$S(m-1) = \frac{m-1}{2}(3+\rho^m) - 2\rho \cdot \frac{1-\rho^{m-1}}{1-\rho}$$

and $W_B$ is the weighting coefficient of distortion for a third mode frame; and determination means for determining a combination of all possible combinations, which gives a maximum encoding efficiency, with reference to the encoding efficiency output from said encoding efficiency calculation circuit, and for outputting the determined combination to said image order changing means and to said motion compensation control means.

11. An apparatus according to claim 7, wherein said image order changing means comprises an image memory for sequentially storing moving image data comprising the plurality of continuous frames and an image order control circuit for changing an order of frames from said image memory in accordance with the positions of frames determined by said prediction structure determination means.

* * * * *

UNITED STATES PATENT AND TRADEMARK OFFICE
CERTIFICATE OF CORRECTION

PATENT NO.   : 5,694,171
DATED        : December 2, 1997
INVENTOR(S)  : Jiro Katto It is certified that error(s) appears in the above-identified patent and that said Letters Patent is hereby corrected as shown below:

Column 4, line 63, delete "circuit 150. A counter 122", and insert
--circuit 122. A counter 150--.

Signed and Sealed this

Fourteenth Day of July, 1998

Attest:

BRUCE LEHMAN

*Attesting Officer*   *Commissioner of Patents and Trademarks*